US009686125B2

(12) United States Patent
Smith et al.

(10) Patent No.: US 9,686,125 B2
(45) Date of Patent: Jun. 20, 2017

(54) NETWORK RELIABILITY ASSESSMENT

(71) Applicant: Schweitzer Engineering Laboratories, Inc., Pullman, WA (US)

(72) Inventors: Rhett Smith, Kuna, ID (US); Marc Ryan Berner, Monroe, WA (US); Jason A. Dearien, Moscow, ID (US); Josh Powers, Pullman, WA (US)

(73) Assignee: Schwetizer Engineering Laboratories, Inc., Pullman, WA (US)

( * ) Notice: Subject to any disclaimer, the term of this patent is extended or adjusted under 35 U.S.C. 154(b) by 73 days.

(21) Appl. No.: 14/803,661

(22) Filed: Jul. 20, 2015

(65) Prior Publication Data

US 2017/0026225 A1 Jan. 26, 2017

(51) Int. Cl.
*H04L 12/701* (2013.01)
*H04L 12/24* (2006.01)
*H04L 12/939* (2013.01)
*H04L 12/803* (2013.01)

(52) U.S. Cl.
CPC ........ *H04L 41/0654* (2013.01); *H04L 41/147* (2013.01); *H04L 47/122* (2013.01); *H04L 49/557* (2013.01)

(58) Field of Classification Search
None
See application file for complete search history.

(56) References Cited

U.S. PATENT DOCUMENTS

| | | |
|---|---|---|
| 6,747,957 B1 | 6/2004 | Pithawala |
| 7,218,632 B1 | 5/2007 | Bechtolsheim |
| 7,376,831 B2 | 5/2008 | Kollmyer |
| 7,872,983 B2 | 1/2011 | Lai |
| 8,553,544 B2 | 10/2013 | Lai |

(Continued)

OTHER PUBLICATIONS

Braun, Wolfgang, Menth, Michael, Software-Defined Networking Using Open Flow: Protocols, Applications and Architectural Design Choices, Future Internet, May 12, 2014.

(Continued)

*Primary Examiner* — Alex Skripnikov
(74) *Attorney, Agent, or Firm* — Jared L. Cherry; Richard M. Edge

(57) ABSTRACT

The present disclosure pertains to systems and methods for assessing reliability of communication links in a software defined network (SDN). In one embodiment, a system may include an SDN architecture subsystem configured to generate SDN architecture information and a bandwidth subsystem configured to generate bandwidth information. A latency subsystem may receive the bandwidth information from the bandwidth subsystem and may be configured to generate latency information using the bandwidth information. A failover subsystem may receive the SDN architecture information, the bandwidth information, and the latency information and generate a failover assessment and a failover route for the communication link. A reliability assessment subsystem may receive the SDN architecture information, the bandwidth information, and the latency information, and the failover assessment and generate a reliability assessment. A traffic routing subsystem may receive the reliability assessment and route data traffic to the failover route based on the reliability assessment.

20 Claims, 5 Drawing Sheets

(56) References Cited

U.S. PATENT DOCUMENTS

| | | | |
|---|---|---|---|
| 8,800,044 B2 | 8/2014 | Raad | |
| 9,237,129 B2 | 1/2016 | Ling | |
| 9,286,171 B2 | 3/2016 | Cardona et al. | |
| 2002/0172157 A1* | 11/2002 | Rhodes | H04L 45/12 370/238 |
| 2003/0112821 A1 | 6/2003 | Cleveland | |
| 2003/0125924 A1 | 7/2003 | Lines | |
| 2003/0188159 A1 | 10/2003 | Josset | |
| 2005/0078672 A1* | 4/2005 | Caliskan | H04L 45/42 370/389 |
| 2008/0005558 A1 | 1/2008 | Hadley | |
| 2011/0087952 A1 | 4/2011 | Marin | |
| 2013/0077477 A1* | 3/2013 | Daraiseh | H04W 40/14 370/225 |
| 2013/0108259 A1* | 5/2013 | Srinivas | H04Q 3/0083 398/25 |
| 2013/0212285 A1 | 8/2013 | Hoffmann | |
| 2013/0294228 A1* | 11/2013 | Ahuja | H04L 41/0654 370/228 |
| 2014/0029451 A1 | 1/2014 | Nguyen | |
| 2014/0160939 A1* | 6/2014 | Arad | H04L 47/122 370/237 |
| 2014/0226467 A1 | 8/2014 | Park | |
| 2014/0376406 A1 | 12/2014 | Kim | |
| 2015/0195190 A1* | 7/2015 | Shah Heydari | H04L 45/22 714/47.3 |
| 2015/0312658 A1 | 10/2015 | Winzer | |
| 2016/0043996 A1 | 2/2016 | Syed Mohamed | |
| 2016/0119299 A1 | 4/2016 | Amulothu | |
| 2016/0142427 A1 | 5/2016 | De Los Reyes | |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

* cited by examiner

NETWORK RELIABILITY ASSESSMENT

FEDERALLY SPONSORED RESEARCH OR DEVELOPMENT

This invention was made with U.S. Government support under Contract No.: DOE-OE0000678. The U.S. Government may have certain rights in this invention.

TECHNICAL FIELD

The present disclosure pertains to systems and methods for assessing the reliability of a communication link in a software defined network ("SDN"). More specifically, but not exclusively, various embodiments consistent with the present disclosure may be configured to assess the reliability of a communication link and to reroute data traffic to evaluate failover paths in an SDN.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
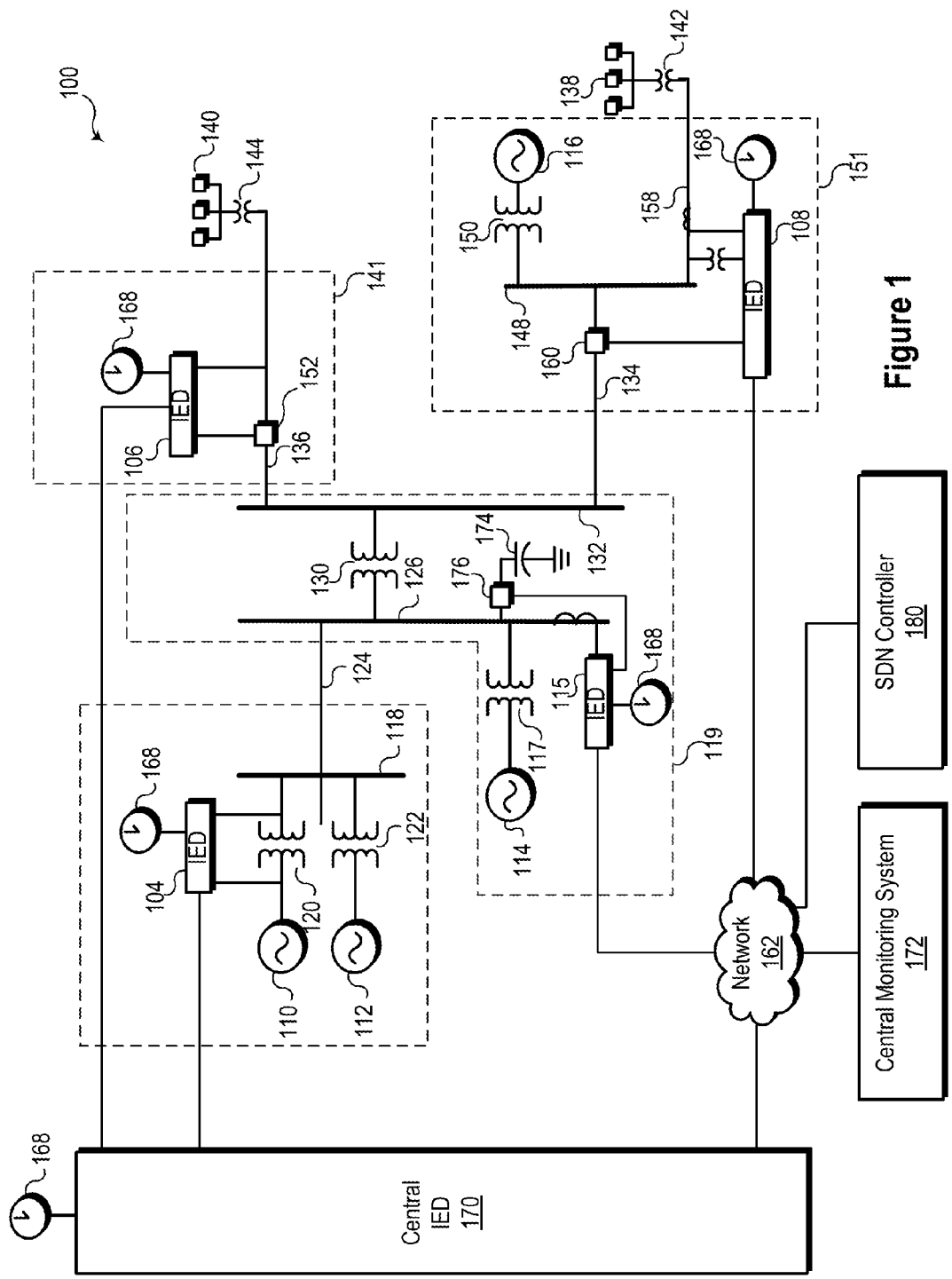
FIG. 1 illustrates a simplified one-line diagram of an electric power transmission and distribution system in which a plurality of communication devices may facilitate communication in a software defined network consistent with embodiments of the present disclosure.

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry information necessary for the proper assessment of power system conditions and for implementing control actions based on such conditions. In addition, such messages may be subject to time constraints because of the potential for rapid changes in conditions in an electric power transmission and distribution system.

Some electric power transmission and distribution systems may incorporate software defined network ("SDN") networking technologies that utilize a controller to configure and monitor on the network. SDN networking technologies offer a variety of advantages that are advantageous in electric power systems (e.g., deny-by-default security, better latency control, symmetric transport capabilities, redundancy and fail over planning, etc.).

An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to achieve the optimal usage of network resources by creating specific data flows through the communication network. A data flow, as the term is used herein, refers to a set of parameters used to match and take action based on network packet contents. Data flows may permit specific paths based on a variety of criteria that offer significant control and precision to operators of the network. In contrast, in large traditional networks, trying to match a network discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) has control logic and data forwarding logic integrated together. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane, by setting their forwarding tables. This enables centralized configuration and management of a network. As such, the data plane in an SDN consists of relatively simple packet forwarding devices with a communications interface to the controller to receive forwarding information. In addition to simplifying management of a network, an SDN architecture may also enable monitoring and troubleshooting features that may be beneficial for use in an electric power distribution system, including but not limited to: mirroring a data selected flow rather than mirroring a whole port; alarming on bandwidth when it gets close to saturation; providing metrics (e.g., counters and meters for quality of service, packet counts, errors, drops, or overruns, etc.) for a specified flow; permitting monitoring of specified applications rather than monitoring based on VLANs or MAC addresses.

Various embodiments consistent with the present disclosure may utilize various features available in an SDN to monitor a physical and/or logical communication link in the network. Information may be gathered by monitoring the physical and/or logical communication link to identify and associate information that may be utilized to assess a likelihood of a failure, to generate information about the precursors to a failure, and to identify the root cause of a failure. Such information may then be used to generate reliable failover paths for data flows within the SDN.

In various embodiments, the centralized nature of an SDN may provide additional information regarding the physical health of network devices and cable connections. A controller in the SDN may receive a variety of metrics from communication devices throughout the network that provide information that may be used to assess the reliability of the network and to identify problems within the network. As data is transmitted on the network, a variety of parameters may be monitored that provide information about the health of each communication device and communication link in the network. For example, in a system utilizing fiber-optic communication links parameters such as reflective characteristics, attenuation, signal-to-noise ratio, and harmonics can be analyzed to determine conditions in which the fiber optic cable is likely to fail in the near future.

The inventors of the present disclosure have recognized that certain advantages may be realized by providing systems and methods that may be utilized to assess the reliability of communication links in a communication network. Based on the assessment of reliability, a variety of actions may be taken. For example, awareness of reliability assessments for various communication links in a communication network may allow for automated incident response actions by the network. Such actions may include routing traffic flows around congested areas, transferring data traffic from an over-burdened device, adjusting transmission parameters to reduce latency for priority flows, or pre-configuring redundant failover paths that may be utilized if the topology of the network changes.

A variety of types of information may be identified and utilized to assess the reliability of a communication link consistent with embodiments of the present disclosure. For example, such information may include network topology, host tracking, and traffic statistics, etc. A variety of known attributes about one or more communication links may be assessed in connection with a reliability assessment for a specific communication link, a plurality of communication links within a network, or for an entire network. The reliability assessment associated with one or more communication links may vary over time based on changing conditions in the network. Such changes may include failure of a communication link, failure of a communication switch, instances of bandwidth saturation, or traffic congestion filling port queues and extending the latency, etc.

Embodiments consistent with the present disclosure may be utilized in a variety of communication devices. A communication device, as the term is used herein, is any device that is capable of accepting and forwarding data traffic in a data communication network. In addition to the functionality of accepting and forwarding data traffic, communication devices may also perform a wide variety of other functions and may range from simple to complex devices.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates an example of an embodiment of a simplified one-line diagram of an electric power transmission and distribution system 100 in which a plurality of communication devices may facilitate communication in a software defined network consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, 136, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

An SDN controller 180 may be configured to interface with equipment in network 162 to create an SDN that facilitates communication between IEDs 170, 115, 108, and monitoring system 172. In various embodiments, SDN controller 180 may be configured to interface with a control plane (not shown) in network 162. Using the control plane, controller 180 may be configured to direct the flow of data within network 162.

SDN controller 180 may be configured to receive information from a plurality of devices in network 162 regarding transmission of data. In embodiments in which network 160 includes fiber optic communication links, the data collected by the SDN controller 180 may include reflection characteristics, attenuation characteristics, signal-to-noise ratio characteristics, harmonic characteristics, packet loss statics, and the like. In embodiments in which network 160 includes electrical communication links, the data collected by the SDN controller 180 may include voltage measurements, signal-to-noise ratio characteristics, packet loss statics, and the like. Of course, network 162 may include both electrical and optical transmission media in various embodiments.

System 100 may be configured to assess the reliability of various communication links in system 100. In various embodiments, SDN controller 180 may be configured to perform various methods disclosed herein for assessing the reliability of network 162. Further, in various embodiments SDN controller 180 may include various subsystems configured to implement the functionality described herein.

Figure 2:
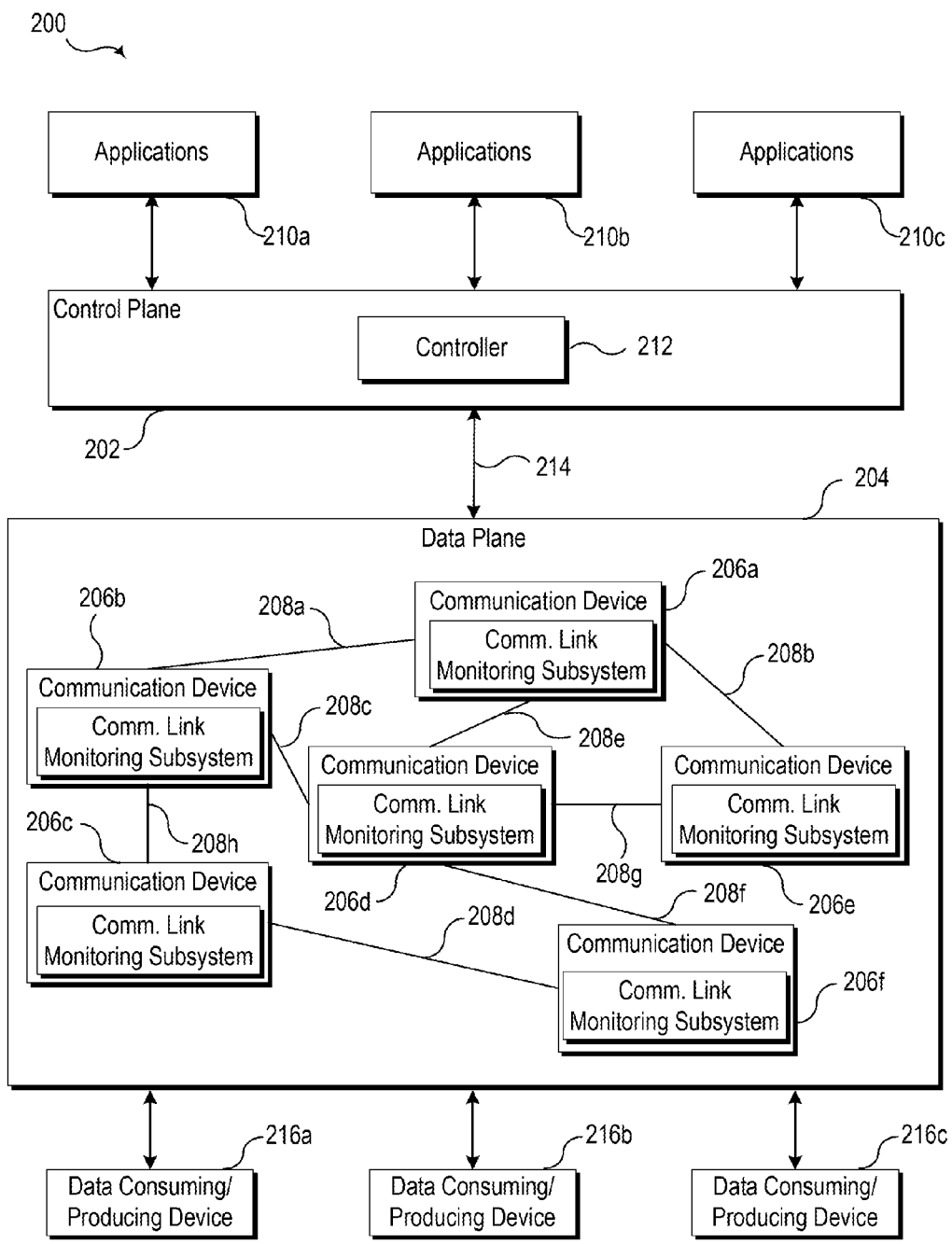
FIG. 2 illustrates a conceptual representation of an SDN architecture including a control plane, a data plane, and a plurality of data consumers/producer devices that may be deployed in an electric power transmission and distribution system consistent with embodiments of the present disclosure.

FIG. 2 illustrates a conceptual representation 200 of an SDN architecture including a control plane 202, a data plane 204, and a plurality of data consumers/producer devices 210a-210c that may be deployed in an electric power transmission and distribution system consistent with embodiments of the present disclosure. The control plane 202 directs the flow of data through the data plane 204. More specifically, a controller 212 may communicate with the plurality of communication devices 206a-206f via an interface 214 to establish data flows. The controller 212 may specify rules for routing traffic through the data plane 204 based on a variety of criteria.

As illustrated, the data plane 204 includes a plurality of communication devices 206a-206f in communication with one another via a plurality of physical links 208a-208h. In various embodiments, the communication devices 206a-206f may be embodied as switches, multiplexers, and other types of communication devices. The physical links 208a-208h may be embodied as Ethernet, fiber optic, and other forms of data communication channels. As illustrated, the physical links 208a-208h between the communication devices 206a-206f may provide redundant connections such that a failure of one of the physical links 208a-208h is incapable of completely blocking communication with an affected communication device. In some embodiments, the physical links 208a-208h may provide an N−1 redundancy or better.

The plurality of applications 210a-210c may represent a variety of applications operating in an applications plane. In the SDN architecture illustrated in FIG. 2, controller 212 may expose an application programming interface (API) that applications 210a-210c can use to configure the data plane 204. In this scenario, controller 212 may act as an interface to the data plane 204 while the control logic resides in the applications 210a-210c. The configuration of controller 212 and applications 210a-210c may be tailored to meet a wide variety of specific needs.

The data consuming/producing devices 216a-216c may represent a variety of devices within an electric power transmission and distribution system that produce or consume data. For example, data consuming/producing devices may be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be routed through the data plane 204 using a plurality of data flows implemented by controller 212. Of course, data consuming/producing devices 216a-216c may be embodied by a wide range of devices consistent with embodiments of the present disclosure.

The plurality of communication devices 206a-206f may each include a communication link monitoring system that may monitor a plurality of physical links 208a-208h. Various parameters may be monitored for different types of physical links. For example, if a communication link monitoring system is monitoring a fiber optic communication link, the monitoring system may collect information regarding reflection characteristics, attenuation characteristics, signal-to-noise ratio characteristics, harmonic characteristics, packet loss statics, and the like. If a communication link monitoring system is monitoring an electrical communication link, the monitoring system may collect information regarding voltage measurements, signal-to-noise ratio characteristics, packet loss statics, and the like. The information collected by the communication link monitoring systems may be communicated to the controller 212.

Based on the information collected about the physical links 208a-208h, the controller 212 may assess the reliability of the physical or logical communication links between devices in system 200. For example, a logical communication link between device 216a and 216c may be created using communication devices 206c and 206f and physical link 208d. The controller 212 may receive information about the health of the logical communication link created by communication devices 206c and 206f and physical link 208d from the communication link monitoring subsystems in communication devices 206c and 206f. In the event that a problem is detected in the physical link 208d, controller 212 may create a failover communication path. In various embodiments, the failover path may be specified in advance or may be dynamically created based on various criteria (e.g., available bandwidth, latency, shortest path, etc.). In the event that data traffic must be redirected because of a failure of physical link 208d, a new logical communication link may be created. The logical communication link may be embodied utilizing a variety of paths, with the shortest failover path utilizing communication device 206c, physical link 208h, communication device 206b, physical link 208c, communication device 206d, physical link 208f, and communication device 206f.

Figure 3:
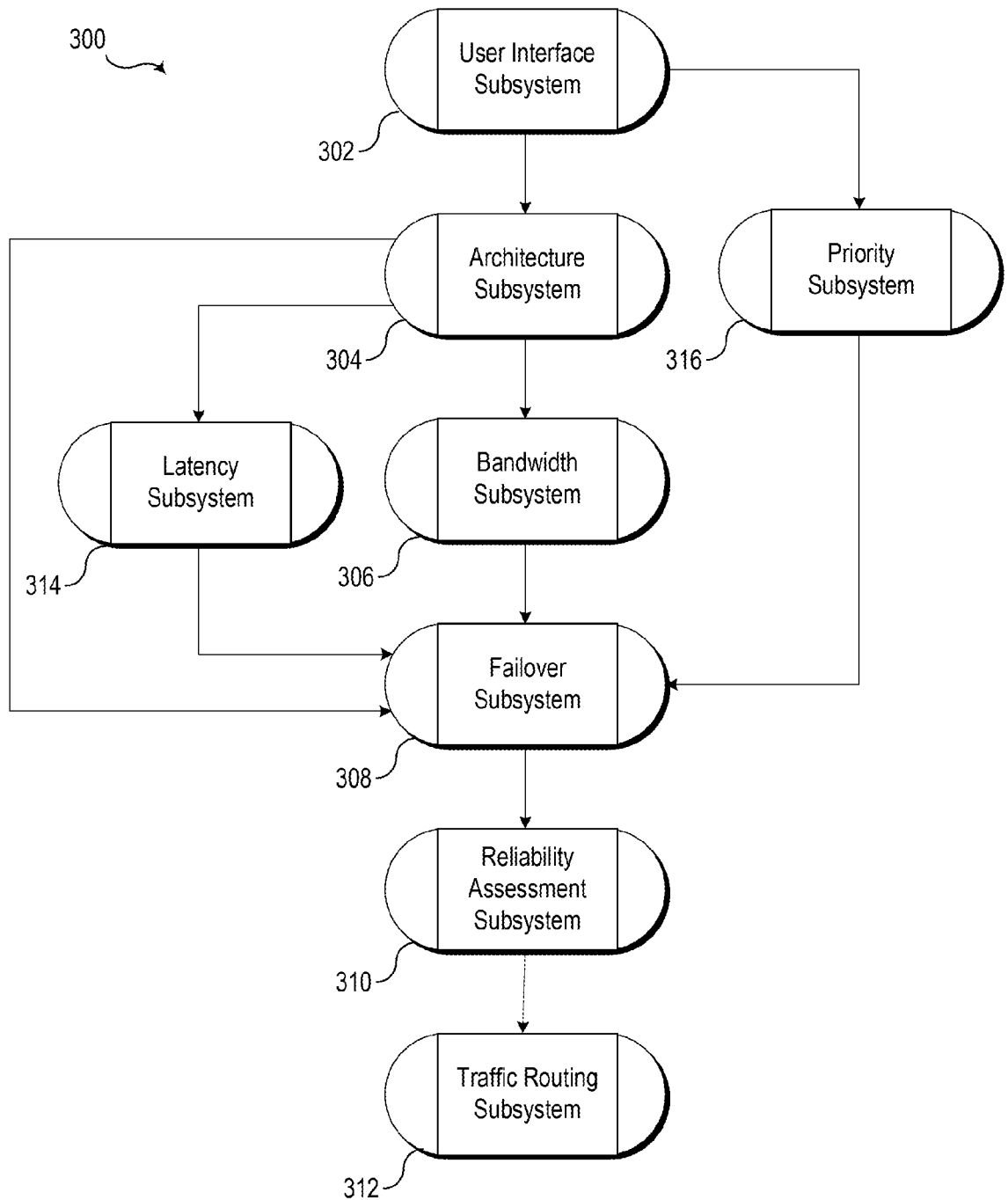
FIG. 3 illustrates a flow of information in a system configured to assess the reliability of a communication link and to evaluate failover paths in an SDN consistent with embodiments of the present disclosure.

FIG. 3 illustrates a flow of information in a system 300 configured to assess the reliability of a communication link and to evaluate failover paths in an SDN consistent with embodiments of the present disclosure. A user interface subsystem 302 may be configured to receive input from a user. Such input may include priority information associated with various communication flows in a network and/or information about the architecture of a network. The architecture subsystem 304 may be configured to determine the architecture of a network. In various embodiments, the architecture may be determined by an SDN controller, while in other embodiments other techniques may be used to determine the topology of the network. For example, the topology of the network may be discovered using a variety of techniques.

The output of the user interface subsystem 302 may also be provided to priority subsystem 316. In various embodiments, the user information provided by user interface subsystem 302 may include an identification of high priority traffic flows. In some embodiments, priority subsystem 316 may also be configured to determine priority information associated with communications without user intervention. Identification of priority communication flows may be determined automatically based on various criteria, such as data type, traffic origin, traffic destination, etc.

The output from the architecture subsystem 304 may be provided to a bandwidth subsystem 306. The bandwidth subsystem 306 may be configured to monitor bandwidth utilization throughout the network. Monitoring of bandwidth utilization throughout the network may enable system 300 to route traffic through the network so as to avoid delays associated with traffic congestion or the loss of traffic due to network saturation. Bandwidth subsystem 306 may utilize information from the architecture subsystem 304 to analyze potential backup paths.

The output from the architecture subsystem 304 may also be provided to latency subsystem 314. Latency subsystem 314 may be configured to monitor latency throughout the network. Latency subsystem 314 may receive information from various devices throughout the network and may monitor various physical and logical communication links to determine latency associated with transmission of data through such links. The latency statistics may be utilized to assess potential failover paths in a network.

The output of architecture subsystem 304, latency evaluation subsystem 314, bandwidth subsystem 306, and priority subsystem 316 may be provided to a failover subsystem 308. The failover subsystem 308 may identify failover paths for various communication flows. Failover paths may be adapted to address changes in the network, including failures of communication links, failures of routing devices, areas of congestion in the network, etc.

The reliability assessment subsystem 310 may be configured to combine known attributes of the network gathered by each of the other subsystems and provide a reliability assessment of one or more communication channels in the network. In some embodiments, an initial reliability assessment may be determined at commissioning based on profiles of hosts and switches, during any topology change, and updated periodically on measured data. In various embodiments, the reliability assessment subsystem 310 may provide an indication of the reliability assessment to the user. The reliability assessment may be used as a metric of the overall confidence an operator may place in the reliability of the network infrastructure.

SDN technology allows networks to be engineered in advance and every flow forwarding path to be predetermined. The SDN technology also provides a platform for the technology being developed under the SDN Project to track the network topology, host tracking, and traffic statistics. Such information may be used to determine whether each link, each switch, and/or each host is handling an appropriate traffic load of traffic for the services it is configured to provide and the contingencies. Such information may also be utilized to assess risks associated with such devices.

A traffic routing subsystem 312 may be configured to generate a variety of communication flows. The traffic routing subsystem 312 may specify the configuration of a variety of intermediate devices (e.g., routers, switches, multiplexers, etc.), separating communicating hosts. The traffic routing subsystem 312 may be configured to adjust the traffic based on the reliability assessment generated by reliability assessment subsystem 310.

Figure 4:
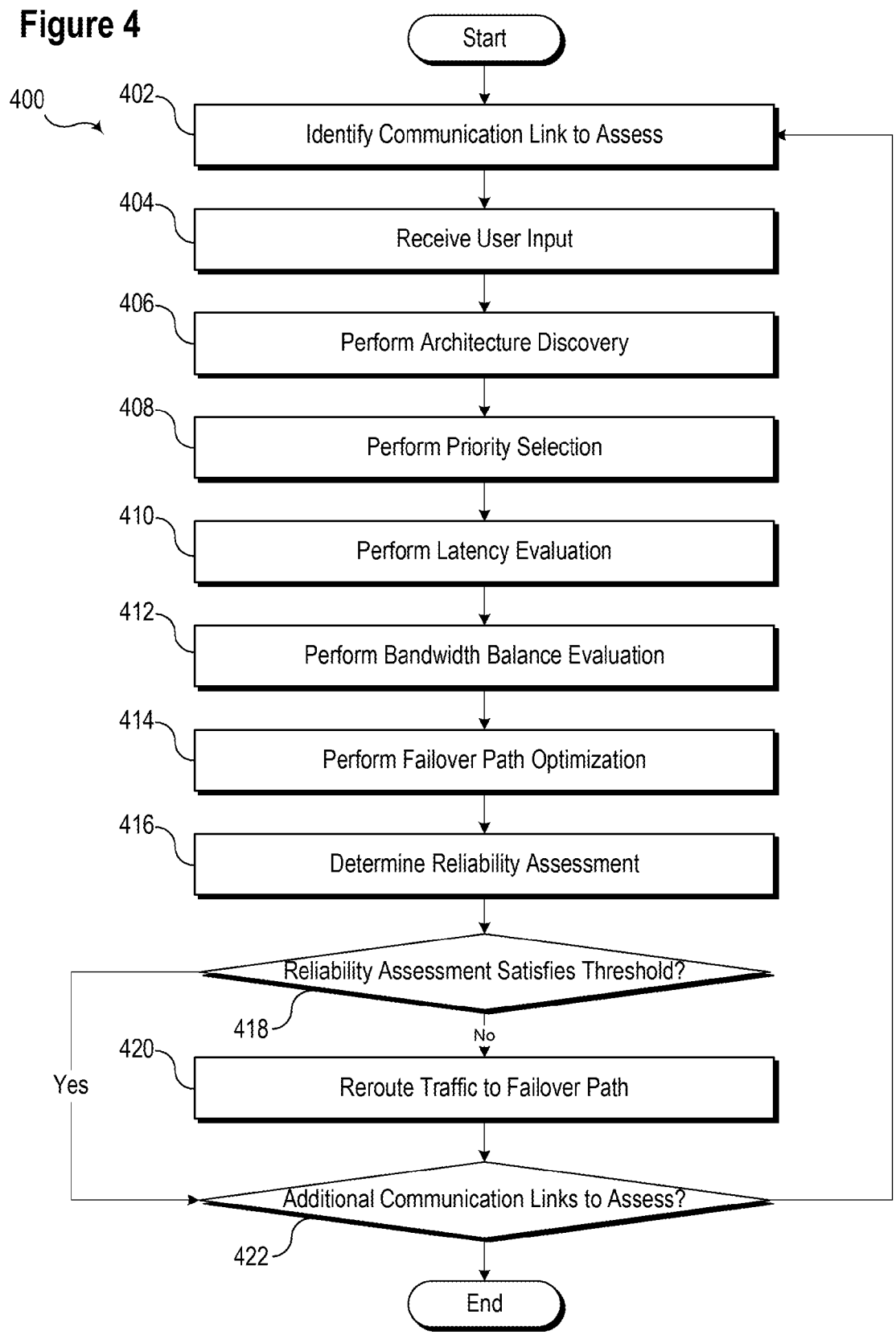
FIG. 4 illustrates a flow chart of a method of assessing the reliability of a communication link and evaluating failover paths in an SDN consistent with embodiments of the present disclosure.

FIG. 4 illustrates a flow chart of a method 400 of assessing the reliability of a communication link and evaluating failover paths in an SDN consistent with embodiments of the present disclosure. At 402, a communication channel to be assessed may be identified. In various embodiments, a system implementing method 400 may be configured to assess a plurality of communication links based on conditions in a network (e.g., failure of a communication link, a change in network topology, bandwidth saturation, etc.). In one specific embodiment, an assessment of various communication links may be performed according to a schedule. In some networks, each communication link may be assessed, while in other networks a subset of the communication links may be assessed. In some cases, the subset of links to be assessed may be based, at least in part, on the priority of traffic carried by the link.

At 404, user input may be received by a system implementing method 400. In various embodiments, the user input may include information regarding the architecture of a network or regarding priority of communication flows within the network. While some embodiments may rely on user input for various types of information, other embodiments may rely on automated network discovery to determine a network's architecture and/or to establish the priority of communication flows in a network.

At 406, discovery of network architecture related to a communication link may be performed. In some embodiments, an SDN controller may monitor and control the architecture of the network, and as such, the discovery of the network architecture may involve interrogation of an SDN controller. In other embodiments, the network architecture associated with the communication link may be discovered using a variety of automated techniques. In one specific embodiment, each device may utilize various protocols to identify and interrogate connected devices, such as the Link Layer Discovery Protocol ("LLDP"). In some embodiments, network architecture may be determined without respect to a specific communication link, and as such, the discovery of the network architecture may be performed only once in connection with method 400.

At 408, a priority selection may be performed based on user input, automated determinations, or a combination of both user input and automated determination. The priority of a specific communication link may be analyzed in connection with various embodiments of the present disclosure to assess failover paths associated with different communication links. The priority designation of a particular flow may be used in various ways. For example, certain physical communication paths may be reserved for high priority traffic, and as such, failover paths with a low priority would not be transmitted on such links.

At 410, a latency evaluation may be performed for the communication link being assessed. In various embodiments, the devices that constitute a logical communication link or a physical communication link may monitor the latency of data traffic through the link. The latency measurements may assess a system in determining whether a specific failover path satisfies applicable latency criteria for the communication link being assessed.

At 412, a bandwidth evaluation may be performed for the communication link being assessed. The bandwidth evaluation may analyze the available bandwidth on a variety of communication channels. The bandwidth evaluation may further assess the impact on the bandwidth of a communication link associated with rerouting failover traffic through the communication link.

At 414, a failover path optimization may be performed for the communication link being assessed. The availability of alternative communication paths that may be utilized in the event of disruption on the network may increase the reliability of the communication link. According, the failover path optimization may be configured to identify and assess potential failover paths.

At 416, a reliability assessment may be determined based on all of the available information relating to the communication link being assessed. In various embodiments, the reliability assessment may be based on, the existence of failover paths identified at 414, the availability of sufficient bandwidth for the communication link determined at 412, the latency evaluation performed at 410, the priority selection performed at 408, the network architecture discovered at 406, and the user input received at 404. In some embodiments, the reliability assessment may include a grade that is presented to a user. The grade may be reflected in various ways, including a numerical scale (e.g., a number between 1 and 10) or a letter scale (e.g., a letter between "A" and "F"). The grade may provide a simple and easy-to-understand representation of the reliability assessment that may allow the user to either accept the risk of an unrecoverable communication failure associated with the reliability assessment or to mitigate the risk by changing physical or logical conditions to improve the reliability assessment.

At 418, method 400 may determine whether the reliability assessment satisfies a reliability threshold for the communication link being assessed. In some embodiments, the threshold may be established based on at least some of the same criteria evaluated by method 400. For example, a communication link used to carry high priority traffic may be subject to a stringent threshold. A stringent threshold may ensure that the communication link maintains a high level of reliability.

In the event that the reliability assessment fails to satisfy the threshold at 418, traffic communicated through the communication link being assessed may be rerouted to a failover path at 420. If the reliability assessment satisfies the threshold at 418, or after the traffic has been rerouted to the failover path at 420, method 400 may determine at 422 whether additional communication channels are to be assessed. In various embodiments, a plurality of communication channels may be assessed.

Figure 5:
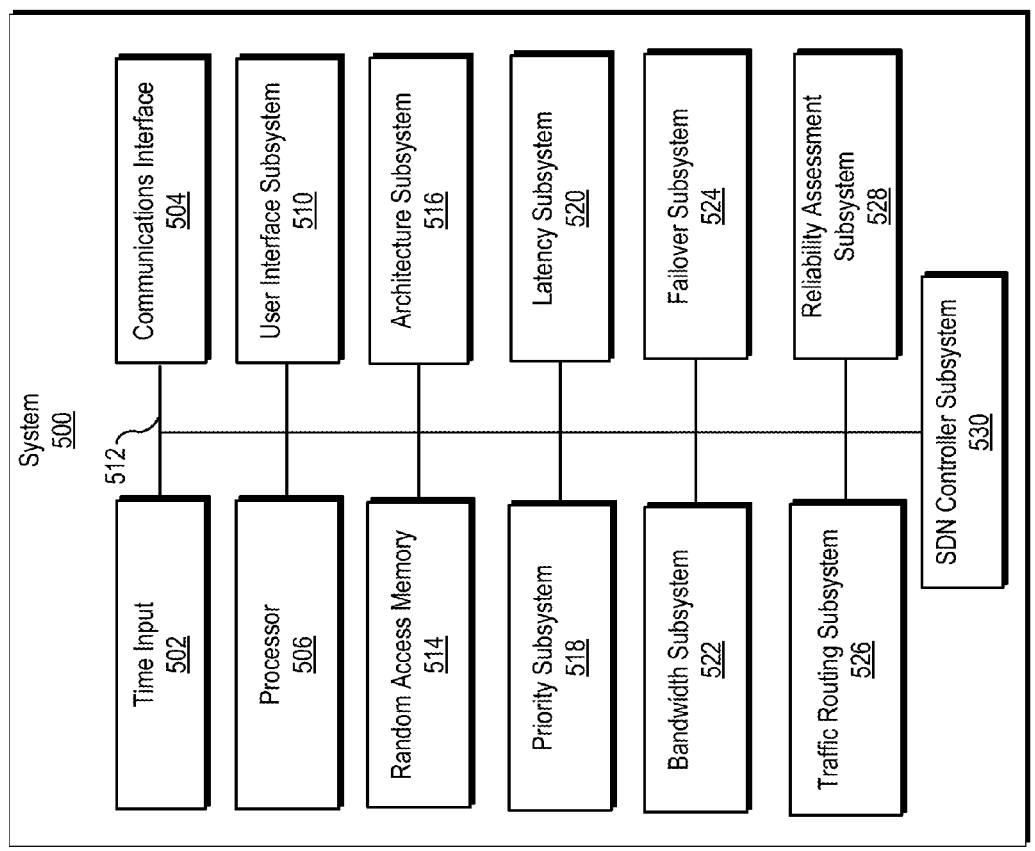
FIG. 5 illustrates a functional block diagram of a system configured to assess the reliability of a communication link and to evaluate failover paths in an SDN consistent with embodiments of the present disclosure.

FIG. 5 illustrates a functional block diagram of a system 500 configured to assess the reliability of a communication link and to evaluate failover paths in an SDN consistent with embodiments of the present disclosure. In some embodiments, system 500 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

System 500 includes a communications interface 504 configured to communicate with other devices (not shown). Communications interface 504 may facilitate communications with multiple devices. System 500 may further include a time input 502, which may be used to receive a time signal (e.g., a common time reference) allowing system 500 to apply a time-stamp to received data. In certain embodiments, a common time reference may be received via communications interface 504, and accordingly, a separate time input may not be required. One such embodiment may employ the IEEE 1588 protocol. A data bus 512 may facilitate communication among various components of system 500.

Processor 506 may be configured to process communications received via communications interface 504 and time input 502 and to coordinate the operation of the other components of system 500. Processor 506 may operate using any number of processing rates and architectures. Processor 506 may be configured to perform any of the various algorithms and calculations described herein. Processor 506 may be embodied as a general purpose integrated circuit, an application specific integrated circuit, a field-programmable gate array, and/or any other suitable programmable logic device.

Instructions to be executed by processor 506 may be stored in random access memory 514 (RAM). Such instructions may include information for processing routing and processing data packets received via communications interface 504 based on a plurality of data flows.

A user interface subsystem 510 may be configured to allow a user to provide or receive information relating a plurality of communication links in a network. In some embodiments, the user interface subsystem may be configured to receive input from a user relating to priority information associated with various communication flows in a network and/or information about the architecture of a network. Further, the user interface subsystem 510 may permit a reliability assessment to be presented to a user in some embodiments. Still further, the user interface subsystem 510 may also be configured to provide notification to a user of changes in the reliability assessment of one or more communication links.

An architecture subsystem 516 may be configured to determine the architecture of a network. In various embodiments, the architecture may be determined in conjunction with SDN controller subsystem 530, while in other embodiments other techniques may be used to determine the topology of the network. For example, the topology of the network may be discovered using a variety of automated protocols and techniques.

A priority subsystem 518 may be configured to receive or to determine an indication of priority associated with a communication link. Identification of priority communication flows may be determined automatically based on various criteria, such as data type, traffic origin, traffic destination, etc.

A latency subsystem 520 may be configured to monitor latency throughout the network. Latency subsystem 520 may receive information from various devices throughout the network and may monitor various physical and logical communication links to determine latency associated with transmission of data through such links. Information relating to latency may be made available to the failover subsystem 524, the traffic routing subsystem 526, and or the reliability assessment subsystem 528 to aid in the performance of the functions of these subsystems.

A bandwidth subsystem 522 may be configured to monitor bandwidth utilization throughout the network. Monitoring of bandwidth utilization throughout the network may enable routing of traffic through the network so as to avoid delays associated with traffic congestion or the loss of traffic due to network saturation. Information relating to bandwidth available on various communication links may be made available to the failover subsystem 524, the traffic routing subsystem 526, and or the reliability subsystem 528 to aid in the performance of the functions of these subsystems.

A failover subsystem 524 may identify failover paths for various communication flows. Failover paths may be adapted to address changes in the network, including failures of communication links, failures of routing devices, areas of congestion in the network, etc. The failover subsystem 524 may be configured to assess a variety of failover paths and to select a specific failover path to be utilized upon the occurrence of an event that requires traffic to be rerouted to a failover path. In one embodiment, the failover subsystem 524 may be invoked whenever any additional failure (e.g., loss of a physical communication link, loss of a network device, etc.) will cause a loss of communications, to establish a new back-up path for the communications if one exists.

A traffic routing subsystem 526 may be configured to create communication flows through a network. The traffic routing subsystem 526 may specify the configuration of a variety of intermediate devices (e.g., routers, switches, multiplexers, etc.), separating communicating hosts. In various embodiments, the traffic routing subsystem 526 may be configured to adjust the traffic based on the reliability assessment generated by reliability assessment subsystem 528.

A reliability assessment subsystem 528 may be configured to combine known attributes of the network gathered by the other subsystems in system 500 and provide a reliability assessment of one or more communication channels in the network. In various embodiments, the reliability assessment subsystem 528 may provide an indication of the reliability assessment to the user in conjunction with user interface subsystem 510. The reliability assessment generated by reliability assessment subsystem 528 may be used as a metric of the overall confidence an operator may place in the reliability of the network infrastructure.

An SDN controller subsystem 530 may be configured to perform a variety of functions associated with an SDN. The SDN controller subsystem 530 may implement various SDN controller functions directly, or the SDN controller subsystem 530 may be configured to coordinate operations of system 500 with an SDN controller (not shown).

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A method of assessing reliability of a communication link in a software defined network (SDN), comprising:
generating SDN architecture information using a SDN architecture subsystem;
providing the SDN architecture information from the SDN architecture subsystem to a bandwidth subsystem;
generating bandwidth information using the bandwidth subsystem and based at least in part on the SDN architecture information;
providing the bandwidth information from the bandwidth subsystem to a latency subsystem;
generating latency information using the latency subsystem and based at least in part on the bandwidth information;
providing the SDN architecture information, the bandwidth information, and the latency information to a failover subsystem;
generating a failover assessment using the failover subsystem based at least in part on the SDN architecture information, the bandwidth information, and the latency information;
providing the failover assessment to a reliability assessment subsystem;
generating a reliability assessment using the reliability assessment subsystem based on at least the failover assessment, the latency information, the bandwidth information, and the SDN architecture information;
providing the reliability assessment to a traffic routing subsystem and routing data traffic to a failover route determined by the failover subsystem based on the reliability assessment.

2. The method of claim 1, further comprising:
receiving an input from a user using a user interface subsystem,
providing the input from the user to a priority subsystem;
generating a priority assessment based at least in part on the input from the user using the priority subsystem;
wherein generating the failover assessment is further based at least in part on the priority assessment.

3. The method of claim 1, further comprising:
receiving an input from a user using a user interface subsystem,
providing the input from the user interface subsystem to the architecture discovery subsystem;
wherein generating the SDN architecture information is based at least in part on the input from the user.

4. The method of claim 1, further comprising:
generating a user notification based on the reliability assessment using a user interface subsystem.

5. The method of claim 1, further comprising:
prompting a user to confirm the failover route prior to routing the data traffic to the failover route using a user interface subsystem.

6. The method of claim 1, further comprising:
displaying a representation of the reliability assessment to a user.

7. The method of claim 6, wherein the representation of the reliability assessment comprises a grade.

8. The method of claim 1, wherein the reliability assessment comprises an assessment of a risk of an unrecoverable communication failure on the communication link.

9. The method of claim 1, further comprising:
determining the reliability assessment based on one of a schedule and a change in network architecture.

10. A system configured to assess reliability of a communication link in a software defined network (SDN), comprising:
an SDN architecture subsystem configured to generate SDN architecture information;
a bandwidth subsystem configured to receive the SDN architecture information from the SDN architecture subsystem and to generate bandwidth information based at least in part on the SDN architecture information;
a latency subsystem configured to receive the bandwidth information from the bandwidth subsystem and configured to generate latency information based at least in part on the bandwidth information;
a failover subsystem configured to:
receive the SDN architecture information, the bandwidth information, and the latency information;
generate a failover assessment based at least in part on the SDN architecture information, the bandwidth information, and the latency information; and
generate a failover route for the communication link;
a reliability assessment subsystem configured to receive the SDN architecture information, the bandwidth information, and the latency information, and the failover assessment and to generate a reliability assessment based on at least the failover assessment, the latency information, the bandwidth information, and the SDN architecture information; and
a traffic routing subsystem configured to receive the reliability assessment and to route data traffic to the failover route based on the reliability assessment.

11. The system of claim 10, further comprising:
a user interface subsystem configured to receive an input from a user.

12. The system of claim 11, further comprising:
a priority subsystem configured to receive the input from the user interface subsystem and to generate a priority assessment based at least in part on the input from the user using; and
wherein the failover subsystem is further configured to generate the failover assessment based at least in part on the priority assessment.

13. The system of claim 11, wherein the architecture subsystem is further configured to receive the input from the user interface subsystem and the SDN architecture information is based at least in part on the input from the user.

14. The system of claim 11, wherein the user interface subsystem is further configured to generate a user notification based on the reliability assessment using the user interface subsystem.

15. The system of claim 11, wherein the user interface subsystem is configured to prompt a user to confirm the failover route prior to routing the data traffic to the failover route.

16. The system of claim 11, wherein the user interface subsystem is further configured to display a representation of the reliability assessment to a user.

17. The system of claim 16, wherein the representation of the reliability assessment comprises a grade.

18. The system of claim 10, wherein the reliability assessment comprises an assessment of a risk of an unrecoverable communication failure on the communication link.

19. The system of claim 10, wherein the reliability assessment subsystem is further configured to determine the reliability assessment based on one of a schedule and a change in network architecture.

20. The system of claim 10, wherein the traffic routing subsystem is further configured to route the data traffic based on the bandwidth information around an area of congestion in the SDN.

* * * * *